(12) United States Patent
Poma

(10) Patent No.: US 10,721,913 B2
(45) Date of Patent: Jul. 28, 2020

(54) DROP FEEDER

(71) Applicant: David V. Poma, Saginaw, MI (US)

(72) Inventor: David V. Poma, Saginaw, MI (US)

( * ) Notice: Subject to any disclaimer, the term of this patent is extended or adjusted under 35 U.S.C. 154(b) by 173 days.

(21) Appl. No.: 16/111,392

(22) Filed: Aug. 24, 2018

(65) Prior Publication Data

US 2020/0060228 A1 Feb. 27, 2020

(51) Int. Cl.
*A01K 5/02* (2006.01)

(52) U.S. Cl.
CPC .................. *A01K 5/0225* (2013.01)

(58) Field of Classification Search
CPC ...... A01K 5/0114; A01K 5/02; A01K 39/014; A01K 5/0225; A01K 5/0275; A01K 5/0291

USPC ............ 119/57.91, 57.92, 51.02, 51.01, 52.1
See application file for complete search history.

(56) References Cited

U.S. PATENT DOCUMENTS

| | | | |
|---|---|---|---|
| 6,405,674 B1 * | 6/2002 | Majewski | A01K 5/0291 119/51.13 |
| 7,891,317 B2 | 2/2011 | Bodenstab | |
| 8,201,520 B2 | 6/2012 | Meritt | |
| 8,418,651 B1 | 4/2013 | Kight | |
| 8,800,489 B2 | 8/2014 | Coxsey | |
| 2002/0088404 A1 * | 7/2002 | Romeu | A01K 5/0275 119/56.1 |
| 2011/0197819 A1 * | 8/2011 | Montgomery | A01K 5/0225 119/51.11 |

* cited by examiner

*Primary Examiner* — Yvonne R Abbott-Lewis

(57) ABSTRACT

A drop feeder for feeding various types of animals.

1 Claim, 9 Drawing Sheets

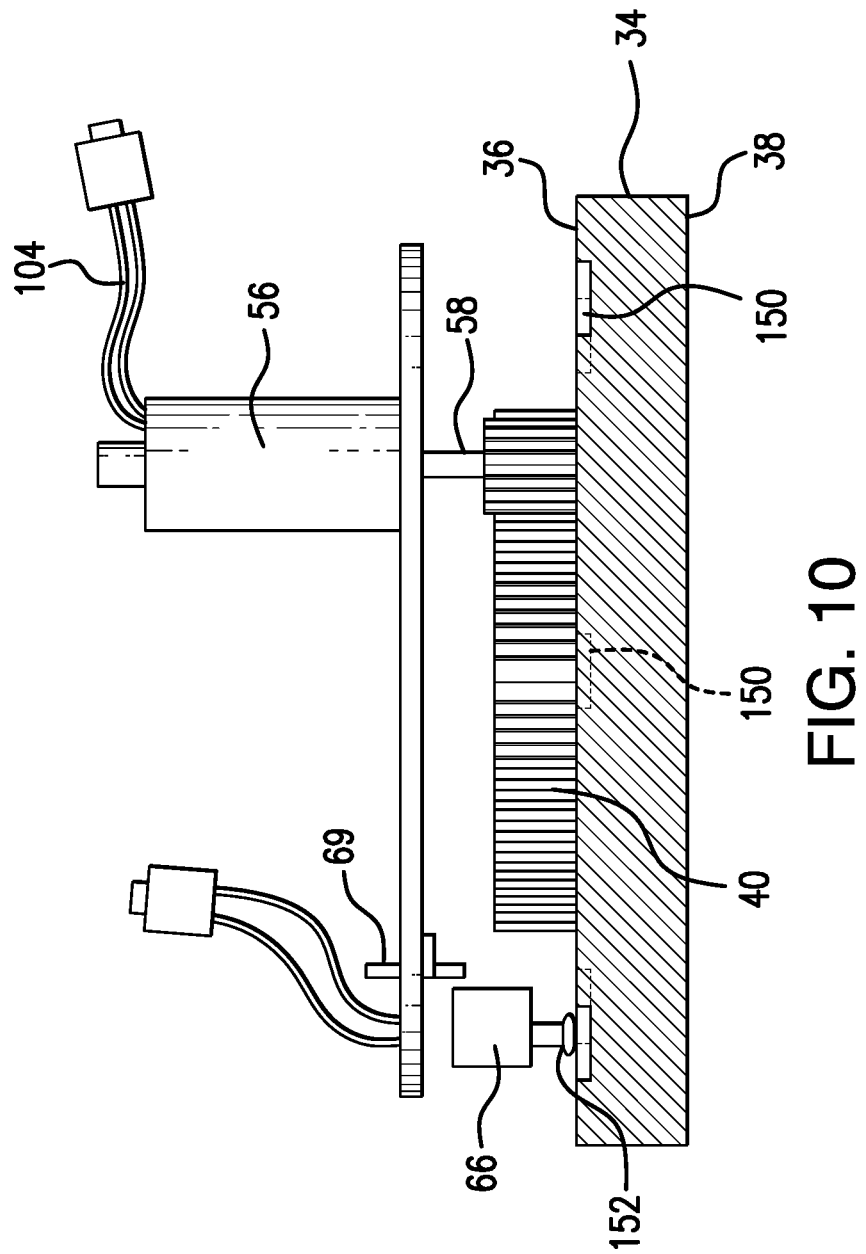

DROP FEEDER

BACKGROUND OF THE INVENTION

The applicant is aware of the following prior art.

U.S. Pat. No. 8,800,489 entitled, "AUGER-OPERATED DEER FEEDER", issued to Coxsey on Aug. 12, 2014 discloses a game feeder that employs a confined auger to convey game feed from a hopper to a desired feed location.

U.S. Pat. No. 7,891,317 entitled, "ANIMAL FEEDER", issued to Bodenstab on Feb. 22, 2011 discloses an animal feeder for supplying a feed to an animal of choice for feeding the animal of choice in an unprotected environment such as the outdoors. The feeder comprising a base for support of the feeder on a ground surface, a support frame extending upwardly from the base and a hopper supported by the frame. The hopper having a storage reservoir for storing a supply of feed with a feed entry opening that is closeable to prevent exposure to the outdoors. The hopper further including a feed chute below the reservoir having an upper region sealingly joined to the reservoir and a lower region below the upper region that is sealingly joined to a feeding chamber. The feeding chamber having a bottom surface wherein the feed supply can move from the reservoir into the feeding chamber and rest on the bottom surface based on gravity alone. The hopper further including a horizontally extending elongated channel extending from the feeding chamber with an outer end having a feeding opening open to the outdoors wherein the feeding chamber is spaced from the opening and the feed substantially remains within the hopper and spaced from the outdoors until it is consumed by the animal of choice.

U.S. Pat. No. 8,201,520 entitled, "ANIMAL FEEDING APARATUS", issued to Meritt on Jun. 19, 2012 discloses a gravity flow animal feed dispensing apparatus which includes feed supply tubes depending from a bottom wall of a feed storage hopper supported by a frame elevated above ground level. Feed dispensing tubes or a plate are connected to the feed supply tubes and flow control baffles and/or a flow control valve limit the dispensing of feed. A wildfowl embodiment of the apparatus includes an access control cage disposed about the feed dispensing member. The orientation of the feed supply tubes and dispensing tubes may be varied to provide access to feed by animals of various sizes and to provide for placement of the apparatus adjacent a confinement wall or fence.

U.S. Pat. No. 8,418,651 entitled, "FEEDER SYSTEM", issued to Kight on Apr. 16, 2013 discloses a trough that has a vertically disposed open front and a parallel rear panel and a horizontally disposed bottom panel. A front edge is located beneath the open front. The trough has an angled panel between the rear panel and the bottom panel. Vertically disposed side panels create a chamber therebetween with a horizontally disposed rectangular open top. A vertically disposed divider panel is located within the chamber. The divider panel is parallel with and spaced between the open front and rear panel. In this manner a major chamber is formed rearwardly and a minor chamber forwardly. A passageway is formed between the divider panel and the bottom panel. In this manner, food in the major chamber will move to the minor chamber upon depletion of food from the minor chamber.

THE INVENTION

The present invention is a drop feeder. The drop feeder has a round feed container with a top cover and is supported on at least three legs. The round feed container contains therein a series of partitioned enclosures. Each partitioned enclosure has a bottom door. The round feed container has a centered round core control column providing a common wall attachment space for partition walls of the partitioned enclosures and contained within the centered round core control column is a control segment.

The control segment is comprised of an upper electrical portion and a lower mechanical portion. The lower mechanical portion is comprised of an actuator base plate that has a top surface and edge openings. The top surface has elongated slots therein. The number of the slots corresponds to the number of partitioned enclosures. The edge has edge openings therein. The number of the edge openings corresponds to the number of the slots.

The actuator base plate is comprised of latch release bolts inserted in each edge opening. There is a latch release spring biasing each of the latch releases. There is a latch release standoff mounted on each of the latch release bolt within each of the slots.

There is a cam lever disc. The cam lever disc comprises a top surface and a bottom surface. The top surface has peripheral indented indices therein. The number of the indices corresponding to the latch release bolt openings. The top surface is surmounted by a detachable aluminum hub gear.

The aluminum hub gear has a centered opening. There is a bushing inserted in the centered opening and there is a bushing inserted in the centered opening of the cam lever disc. The bottom surface is configured such that the bottom surface is essentially hollow, with a segment that is biased on one edge which provides for movement of the latch release bolts when the latch release bolts encounter the biased edge. There is a lower actuator plate spacer element surmounting the actuator base plate and surrounding the cam lever disc.

There is an actuator mid plate surmounting the first spacer element. This actuator mid plate comprises a flat plate that has a plurality of openings therethrough. One opening has inserted therein a gear motor. The motor has a pinion gear attached to a shaft of the motor, at an under surface of the flat plate. There are at least two motor mount screws, a micro switch, a micro switch mount assembly and a micro switch mounting bracket a threaded bolt through said center opening for securing said actuator mid plate to said cam lever disc.

There is an upper spacer element surmounting the actuator mid plate. The upper spacer element has a cap surmounted thereon. The upper electrical portion comprises a cylindrical housing comprising a top one-half and a lower one-half. The lower one-half contains a battery. The battery has an electrical connection element to the lower one-half of the control segment. The top one-half of the upper electrical portion contains a timer. The upper one-half has a cap attached thereto.

BRIEF DESCRIPTION OF THE DRAWINGS

FIG. 10 illustrates the relationship of the indices and the micro switch.

DETAILED DESCRIPTION OF THE DRAWINGS

Figure 1:
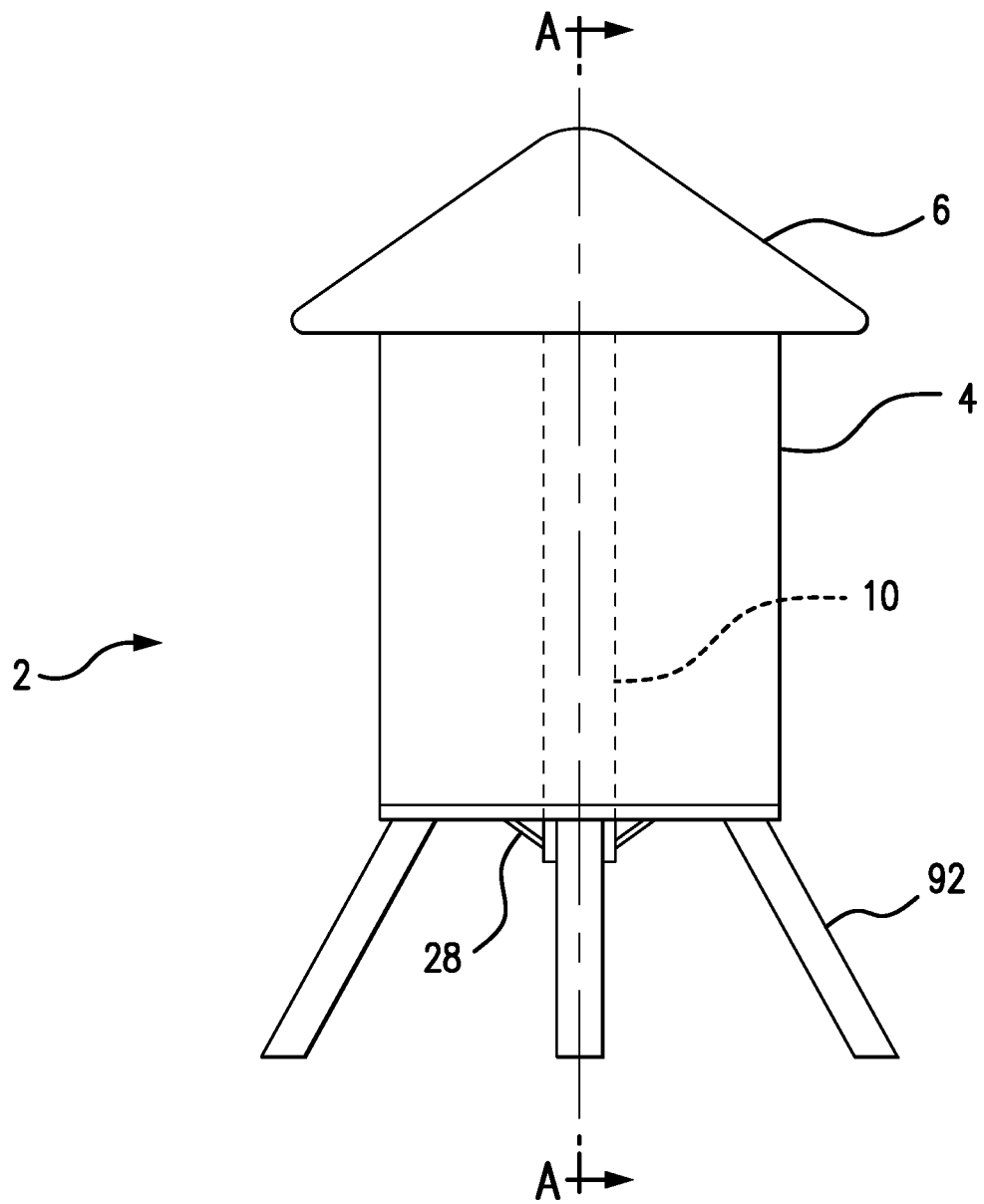
FIG. 1 is a full side view of a drop feeder from the side with line A-A bisecting the drop feeder in half.

FIG. 1 shows the drop feeder 2 from the side with line A-A bisecting the drop feeder 2 in half. The drop feeder 2 has a round container 4 that is supported by at least three legs 92. The central round core control 10 is shown in phantom. Also shown are the latch release bolts 28.

Figure 2:
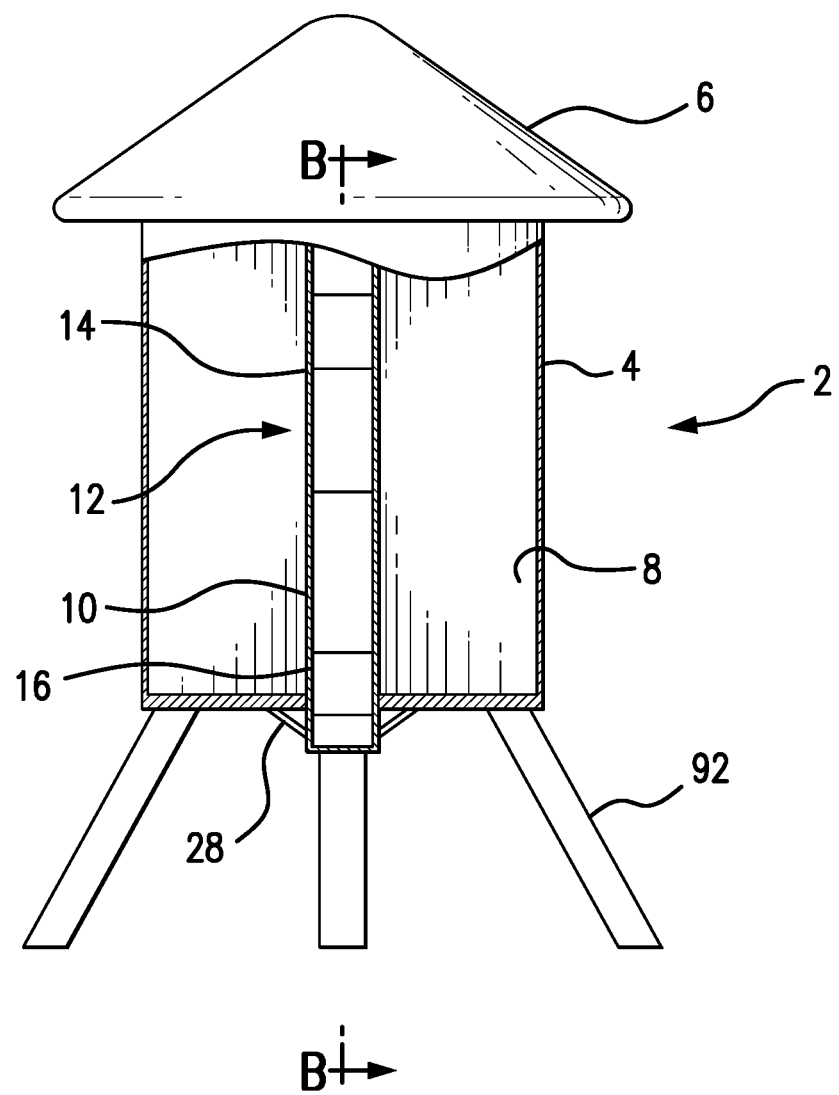
FIG. 2 is a cross sectional view of the drop feeder of FIG. 1, through line A-A.

FIG. 2 shows the interior of the drop feeder 2 along line A-A. The drop feeder 2 has round container 4 that is supported by legs 92. There is a top 6 that is removable to place feed inside. The inside has partitioned enclosures 8 that will hold feed within each separate partitioned enclosure 8. There is a centered round core control column 10. The centered round core control column 10 contains the control segment 12 which is made up of the upper electrical portion 14 and lower mechanical portion 16.

Figure 3:
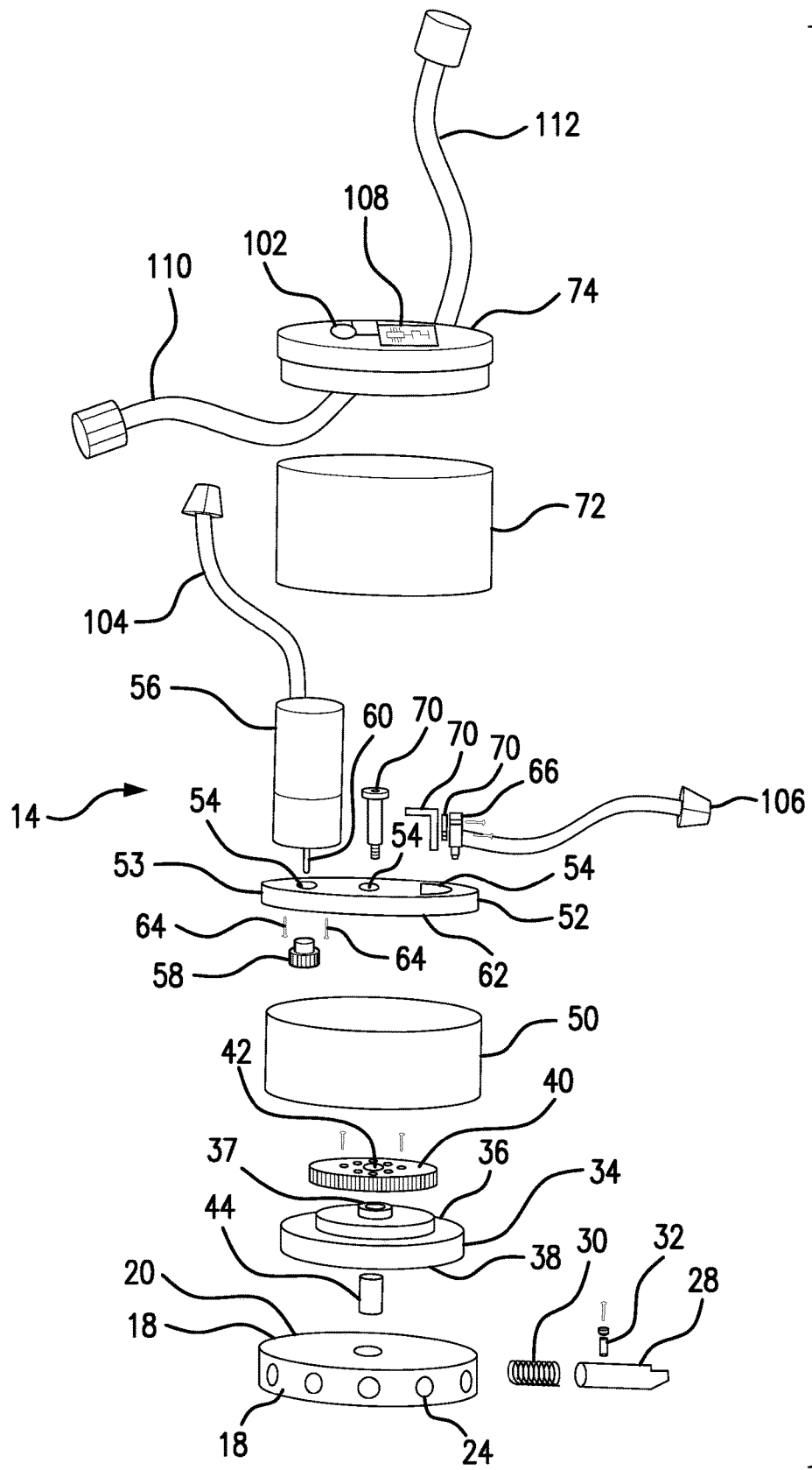
FIG. 3 is an exploded view of the operational part of the core.

FIG. 3 shows the lower mechanical portion 14. There is an actuator base plate 18 that has a top surface 20 and edge openings 24. The top surface 20 has elongated slots therein 22. The exact number of slots corresponds directly to the number of partitioned enclosures 8. The edge 23 has edge openings 24 therein. The number of the edge openings corresponds to the number of the slots 22. The actuator base plate 18 is comprised of latch release bolts 28 inserted in each edge opening 24 and there is a latch release spring 30 biasing each of the latch releases 31. There is also a latch release standoff 32 mounted on each of the latch release bolt 28 within each slot 22.

There is a cam lever disc 34. The cam lever disc 34 is comprised of a top surface 36 and a bottom surface 38. The top surface 36 is surmounted by a detachable aluminum hub gear 40. The aluminum hub gear 40 has a centered opening 42. There is a bushing 44 inserted in the centered opening 42 and there is a bushing 44 inserted in the centered opening 37 of the cam lever disc 34. The bottom surface 38 is configured such that the bottom surface 38 is essentially hollow 46 (shown in FIG. 4), with a segment that is biased on one edge 48 (shown in FIG. 4) which provides for movement of the latch release bolts 28 when the latch release standoff 32 encounters the biased edge 48.

There is a lower actuator plate spacer element 50 surmounting the actuator base plate 18 and surrounding the cam lever disc 34.

There is an actuator mid plate 52 surmounting the first spacer element 50. The actuator mid plate 52 is comprised of a flat plate 53 that has a plurality of openings 54 therethrough. These openings 54 have inserted therein a gear motor 56. This motor 56 has a pinion gear 58 attached to a shaft 60 of the motor 56 at an under surface 62 of the flat plate 53. There are at least two motor mount screws 64, a micro switch 66, a micro switch mount assembly 68, a micro switch mounting bracket 69, a threaded bolt 70 through the center opening 54 for securing the actuator mid plate 52 and the cam lever disc 34 into the actuator base plate 18.

There is an upper spacer element 72 surmounting the actuator mid plate 52. This upper spacer element 72 has a cap 74 surmounted thereon. The cap 74 has an opening 102 that accommodates an electric connection 104 from the motor 56 and another electrical connection 106 from the micro switch 66. The electrical connection 104 and 106 connect to a circuit board 108 surmounted on the cap 74 by electrical connection 110. The circuit board 108 has an electrical connection 112 that connects to the centered round core control column 10.

Figure 4:
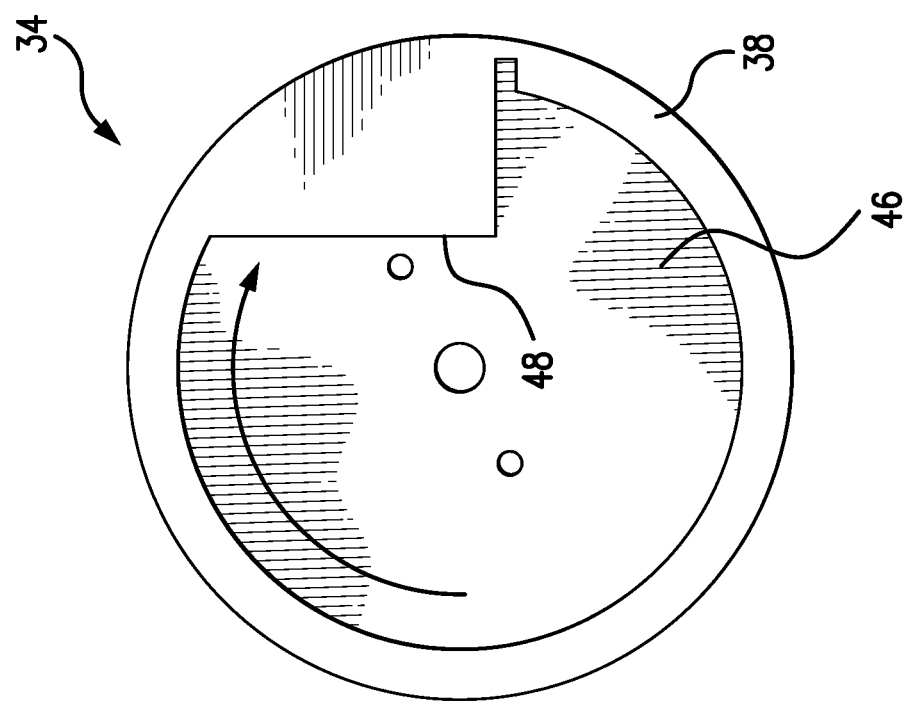
FIG. 4 is a full bottom view of the cam lever disc.

FIG. 4 shows the bottom 38 of the cam lever disc 34. The bottom surface 38 is configured such that the bottom surface 38 is essentially hollow 46, with a segment that is biased on one edge 48 which engages the latch release standoff 32 which provides for movement of the latch release bolts 28 when the latch release standoff encounters 32 the biased edge 48. It has been discovered that the engagement of the latch release standoff 32 with the biased edge 48 lets the drop feed 2 drop a bottom retainer panel and the precise amount of feed within a certain partition enclosure 8 giving the present invention a greater utility over any prior art.

Figure 5:
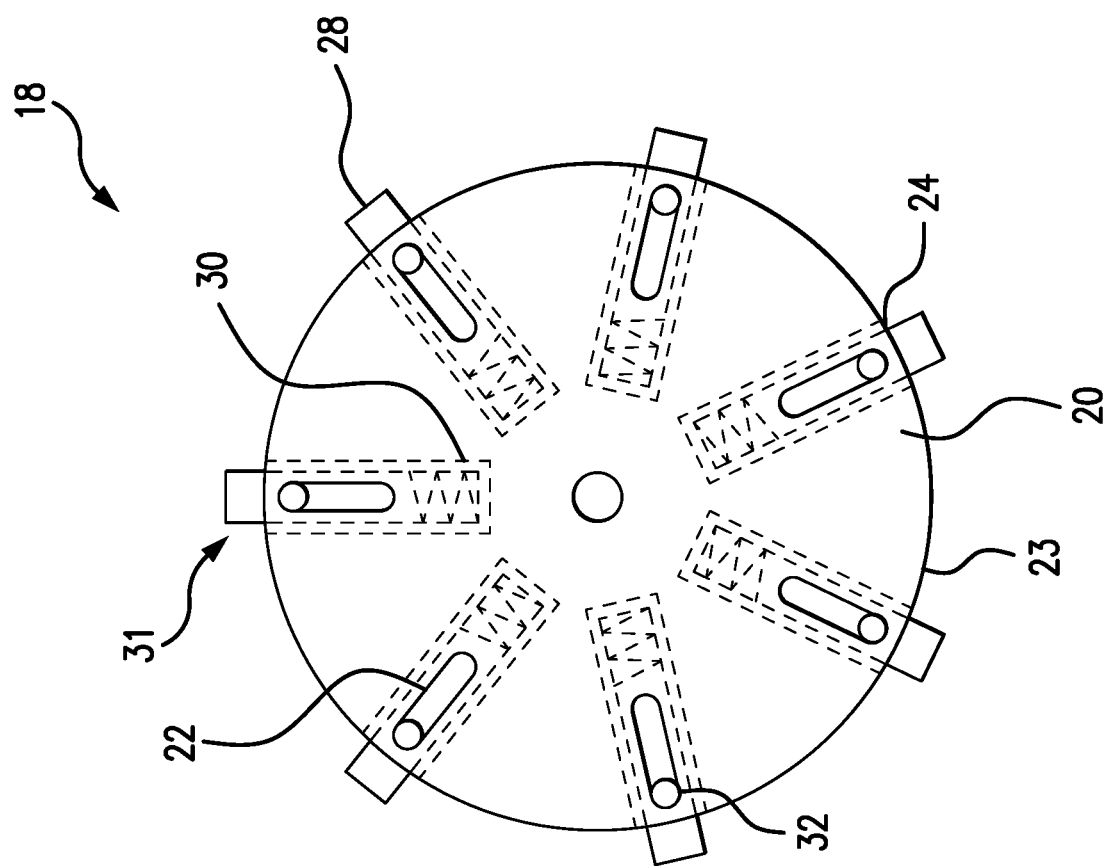
FIG. 5 is a full top view of the activation base.

FIG. 5 shows the activation base plate 18 from the top. There is an actuator base plate 18 that has a top surface 20 and edge openings 24. The top surface 20 has elongated slots therein 22. The exact number of slots corresponds directly to the number of partitioned enclosures 8. The edge 23 has edge openings therein 24. The number of the edge openings 24 corresponds to the number of the slots 22. The actuator base plate 18 is comprised of latch release bolts 28 inserted in each edge opening 24 and there is a latch release spring 30 (shown in phantom) biasing each of the latch releases 31. There is also a latch release standoff 32 mounted on each of the latch release bolts 28 within each slot 22.

The actuator base plate 18 has latch release bolts 28 inserted in each edge opening 24. There is a latch release spring 30 biasing each of the latch release 31. There is a latch release standoff 32 mounted on each the latch release bolt 28 within each elongate slot 22. Again, when the cam lever plate 34 rotates over the actuator base plate 18 it actives a latch release standoff 32 forcing the latch release bolt 28 to retract against the spring 30 releasing the bottom door 120 (shown in FIG. 7) of the partitioned enclosure 8 dropping the feed from that partitioned enclosure.

Figure 6:
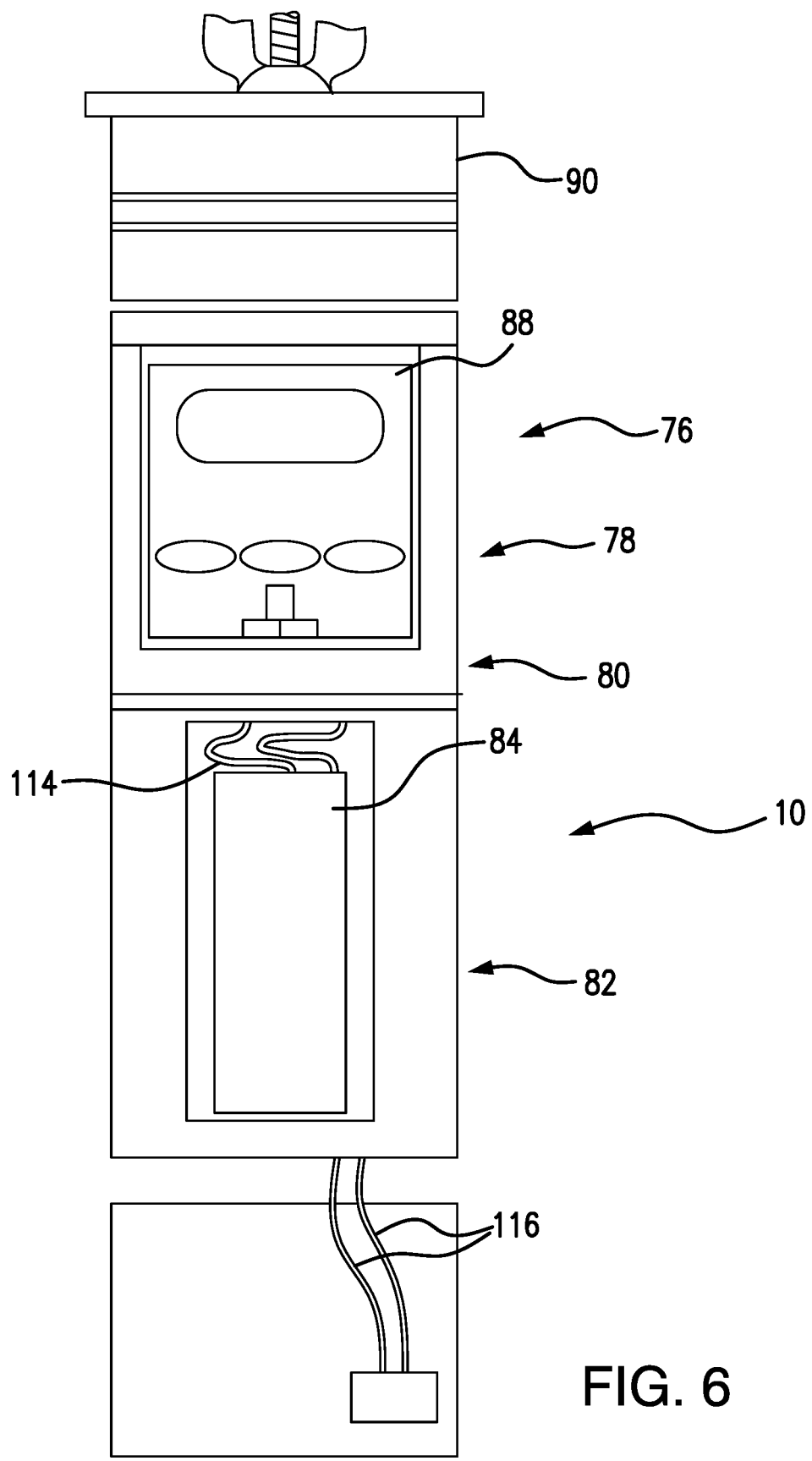
FIG. 6 is a cross sectional view of the core control column through line B-B of FIG. 2.

FIG. 6 shows the centered round core control column 10. The upper electrical portion 76 is comprised of a cylindrical housing 78 comprising a top one-half 80 and a lower one-half 82. The lower one-half 82 contains a battery 84. This battery 84 has an electrical connection element 114 to the lower one-half 82 of the control segment 78. The top one-half 80 of the upper electrical portion 76 contains a timer 88. The upper one-half 80 has a cap 90 attached thereto. The electrical connector 116 supplies power to the electrical connection 112 that powers the circuit board and the rest of the mechanical portion 16.

The centered round core control column 10 houses the battery 84 that provides the power for the drop feeder 2.

The centered round core control column 10 houses the timer 88 that provides the control of the operation of the drop feeder 2.

Figure 7:
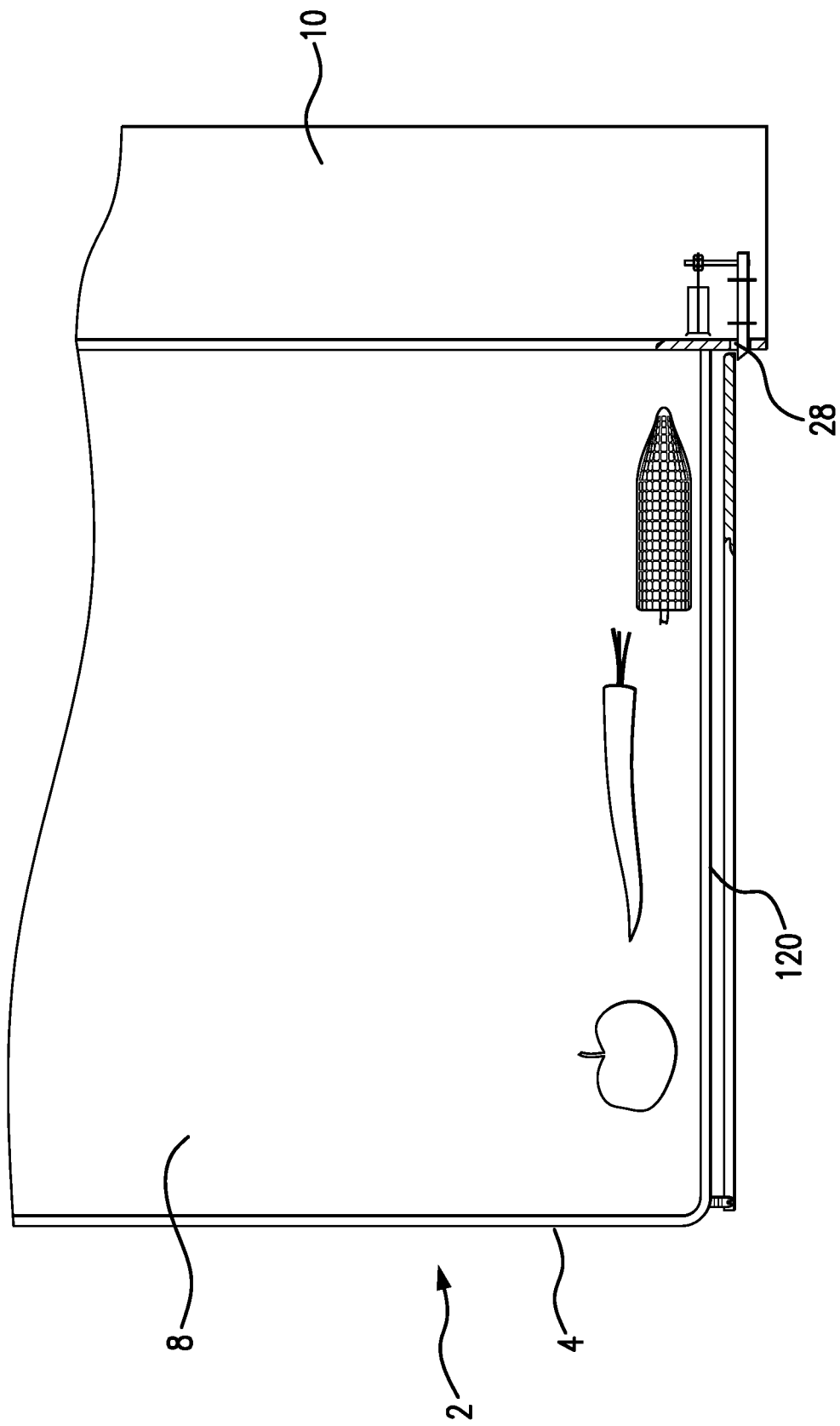
FIG. 7 shows one of the partitioned enclosures.

FIG. 7 shows one of the partitioned enclosures 8. The drop feeder 2 has a plurality of the partitioned enclosures 8 within the round container 4. Each of the partitioned enclosures 8 has a bottom door 120 that is released by the operation of the actuator base plate 18 on the latch release bolt 28. When the latch release bolt 28 is driven inward by the cam lever disc 34 it releases the bottom door 120 dropping the feed housed in that partitioned enclosure 8. When the user returns to the drop feeder 2 they simply replace the bottom door 120 to its original position and replace the feed within the partitioned enclosure 8. The drop feeder 2 is again ready for use.

Figure 8:
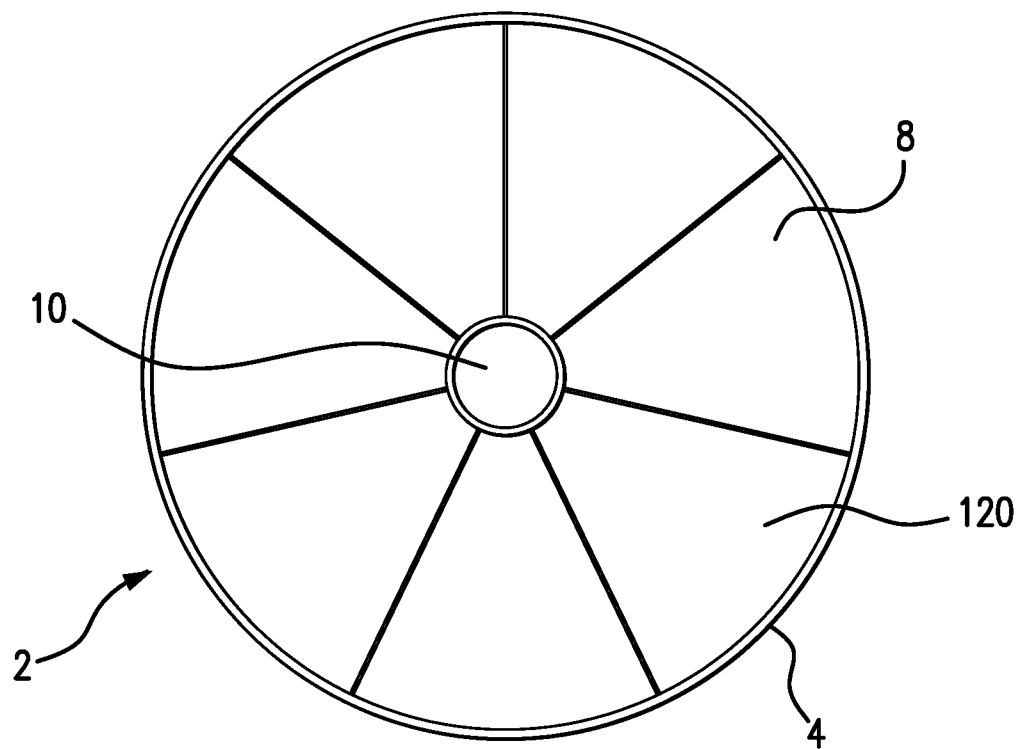
FIG. 8 illustrates the partitioned enclosures from the top.

FIG. 8 shows the partitioned enclosures 8 from the top. This embodiment has seven partitioned enclosures 8 within the round container 4. Also shown are the bottom doors 120. The central round core control 10 is also shown. Each of the portioned enclosures 8 are filled with feed. Different embodiments have different numbers of partitioned enclosures 8. The actuator base plate 18 has the same number of latch release standoffs 32 to partitioned enclosures 8.

Figure 9:
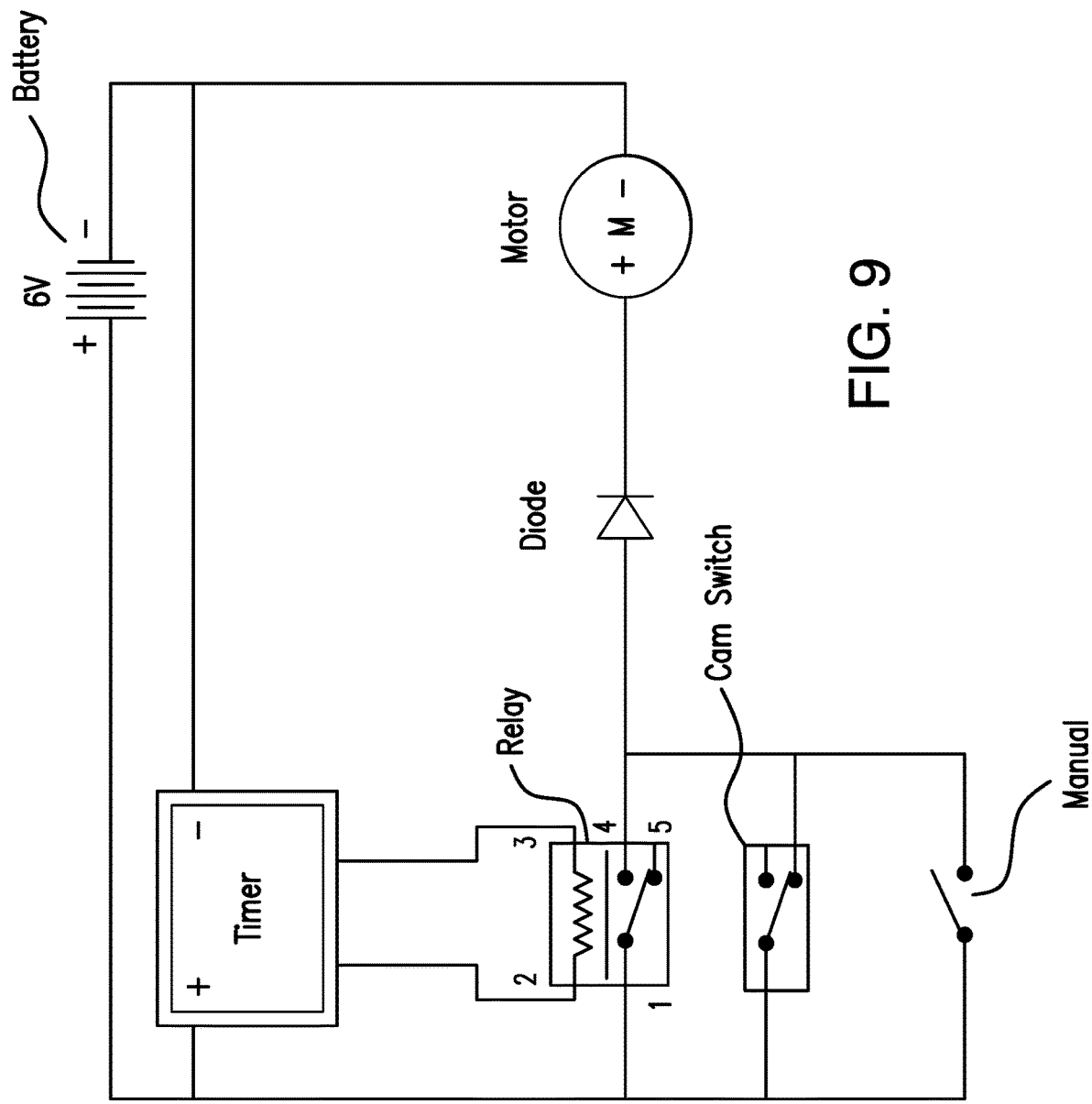
FIG. 9 is one version of the electrical schematic for the drop feeder.

FIG. 9 shows the electrical schematic for the drop feeder 2. The battery 84 powers the electrical system. The battery 84 energizes the timer 88 that is set to the desired time for the drop feeder 2 to operate one bottom door 120 to open and drop its contents. When the timer activates it energizes the power to a relay which sends power to a diode activating the gear motor 56, this in turn, turns the pinion gear 58 which in turn, rotates the aluminum hub gear 40. The diode is present to prevent reverse operation of the motor 56. The rotation of the aluminum hub gear activates the micro switch 66. The rotation of the aluminum hub gear 40 rotates and activation of the micro switch 66 moves the cam lever disc 34. The micro switch 66 has an end 152, when the end 152 drops into an index 150 it stops the motor operations (shown in FIG. 10). As the cam lever disc 34 rotates it will engage a latch release standoff 32 and engages the biased edge 48 which forces the latch release standoff 32 which in turn forces the latch release bolt 28 inward and opens the bottom door 120 depositing the feed onto the ground below.

The circuit board can have a manual switch to operate the motor manually.

FIG. 10 shows the relationship of the indices 150 and the micro switch 66. The cam lever disc 34 has a top surface 36. This top surface 36 has a series of indexes 152. The number of indexes 150 matches the number of partition enclosures 8 and latch release standoffs 32. When the micro switch end 152 drops into one of the indexes it activates, stops the motor 56 until it is time to advance again. The rotation of the motor 56 is controlled by the end 152 of the micro switch 66. When the micro switch end 152 drops into the index 150 it stops the rotation of the motor, stops the movement of the cam lever disc, ceasing operation of the feeder 2.

What is claimed is:

1. A drop feeder, said drop feeder having a round feed container having a top cover and supported on at least three legs;
   said round feed container containing therein a series of partitioned enclosures;
   said round feed container having a centered round core control column providing a common wall attachment space for partition walls of said partitioned enclosures, each said enclosure having a bottom door;
   contained within said centered round core control column, a control segment, said control segment comprised of an upper electrical portion and a lower mechanical portion;
      A. said lower mechanical portion comprised of:
         a. an actuator base plate, having a top surface and edge openings, said top surface having elongated slots therein, the number of said slots corresponding to the number of partitioned enclosures, said edge having elongated openings therein, the number of said elongated openings corresponding to the number of said slots, said actuator base plate comprised of:
            i. latch release bolts inserted in each edge opening, there being a latch release spring biasing each said latch release, there being a latch release standoff mounted on each said latch release bolt within each said slot;
            ii. a cam lever disc, said cam lever disc comprising a top surface and a bottom surface, said top surface having peripheral indented indices therein, said number of said indices corresponding to latch release bolt openings, said top surface being surmounted by a detachable aluminum hub gear, said aluminum hub gear having a centered opening, there being a bushing inserted in said centered opening, there being a bushing inserted in said centered opening of said cam lever disc, said bottom surface being configured such that said bottom surface is essentially hollow, with a segment that is biased on one edge which provides for movement of said latch release bolts when said latch release bolts encounter said biased edge;
            iii. a lower actuator plate spacer element surmounting said actuator base plate and surrounding said cam lever disc;
            iv. an actuator mid plate surmounting said first spacer element, said actuator mid plate comprising:
               a. a flat plate having a plurality of openings therethrough, said openings having inserted therein a gear motor, said motor having a pinion gear attached to a shaft of said motor at an under surface of said flat plate;
               b. at least two motor mount screws;
               c. a micro switch;
               d. a micro switch mount assembly;
               e. a micro switch mounting bracket;
               f. a threaded bolt through said center opening for securing said actuator mid plate to said cam lever disc and said actuator base plate;
            v. an upper spacer element surmounting said actuator mid plate, said upper spacer element having a cap surmounted thereon;
      B. said upper electrical portion comprising:
         i. a cylindrical housing comprising a top one-half and a lower one-half, said lower one-half containing a battery, said battery having an electrical connection element to said lower one-half of said control segment, said top one-half of said upper electrical portion containing a timer, said upper one-half having a cap attached thereto.

* * * * *